United States Patent [19]
Schenkyr et al.

[11] Patent Number: 5,218,600
[45] Date of Patent: Jun. 8, 1993

[54] PROCESS FOR NETWORKING COMPUTERS AND/OR COMPUTER NETWORKS AND NETWORKING SYSTEMS

[75] Inventors: Rainer Schenkyr, Reichenbach; Bernhard Schmid, Stuttgart, both of Fed. Rep. of Germany

[73] Assignee: Richard Hirschmann GmbH & Co., Esslingen, Fed. Rep. of Germany

[21] Appl. No.: 633,909

[22] Filed: Dec. 26, 1990

[51] Int. Cl.⁵ .............................................. H04J 3/14
[52] U.S. Cl. ..................................... 370/16; 370/16.1; 370/85.2; 370/85.3; 370/85.13; 371/8.2
[58] Field of Search ................... 370/16, 16.1, 85.13, 370/85.2, 85.3; 340/825.01, 825.17; 371/8.2

[56] References Cited

U.S. PATENT DOCUMENTS 4,527,270  7/1985  Sweeton ................................. 370/16
4,704,714  11/1987  Tomizawa et al. ................... 370/15
5,010,550  4/1991  Hirata ................................... 370/16

Primary Examiner—Douglas W. Olms
Assistant Examiner—Russell W. Blum
Attorney, Agent, or Firm—Robert J. Koch

[57] ABSTRACT

In a process for interconnecting computers and/or computer networks, the occurrence of an interruption in the network system is detected. A redundant connection is activated as a function of said interruption. The redundant connection is inactive in undisturbed operation. The presence of an interruption is detected by determining whether a data signal appears within a predetermined period of time at the connectors of a redundant connective device. Different criteria are provided to interrupt a closed connecting ring generated by the activation of the redundant connecting device when the initial interference in the network system is eliminated.

24 Claims, 3 Drawing Sheets

PROCESS FOR NETWORKING COMPUTERS AND/OR COMPUTER NETWORKS AND NETWORKING SYSTEMS

BACKGROUND OF THE INVENTION

1. Field of the Invention

The invention relates to a computer network and a process for linking computers and/or sets of computers in a networking system.

2. Description of the Related Technology

"DATACOM" 1988, No. 3, pages 81 to 87, discloses networking methods for linking local networks of computers. Bridges are used in local networks according to the IEEE 802.3 standard or the Ethernet standard, as linking circuits. When a bridge or line fails or is interrupted in a network system and the other bridges analyze the target and source addresses a bridge may recognize the failure or interrupt and take over the data transmission. The bridges are also able to determine when an initially failed bridge has resumed operation based on target and source analysis. This signifies that a ring connection has appeared within the network system, which may lead to faults. Following the detection of a ring connection, the bridges are able to dissolve it.

FIG. 1 schematically shows a networking system using local bridges of this type. The network segments 1, 2 and 3 comprising the individual computers are connected with each other by the local bridges 4, 5 and 6. In case of the failure of one of the local bridges 4, 5 or 6 or one of the lines associated with them, the remaining bridges take over the transmission of data, so that data transmission is assured in the network system even if a line has failed. Following the reestablishment of the line connection involved, a ring connection may be present over local bridges 4, 5 and 6. Ring connections may lead to race situations and must be eliminated. In view of their extensive and complicated circuit technology, the bridges are capable of detecting such a ring connection and interrupting the ring transport. For example, data may be transmitted from the network segment 1 over only one connecting path. Only local bridge 4 and not bridges 5 and 6 is utilized to transmit data from segment 1. The use of such local bridges is often not suitable or desirable in view of their high hardware and software costs and in particular in the layout of smaller network systems FIG. 2 shows another known embodiment of a network system. FIG. 2 shows an optical network based on beam waveguides. Active star coupling connectors 21, 22, 23 and 24 are used to connect the parties. The star couplers 21, 22, 23 and 24 are connected by beam waveguides to adjacent star couplers, as indicated by the lines 25, 26 and 27.. Empty or IDLE signals are transmitted on the connecting lines between data signals or packets in order to monitor the line. The data may be transmitted over a redundant path 28 in case of outage of an IDLE signal as the result of an interruption of the connecting lines 25 or 27, in the star connector 21 or 24. Even during an interruption, the network system will operate in a regular manner.

The use of redundant paths in network systems for redundant transmission of data in case of failure of a connecting line or star connector is limited and not sufficient in point-to point connections or connections with only one star connector located between two other star connectors.

If the connecting line 26 fails between the star connectors 22 and 23, the presence of a redundant path 28 cannot compensate this fault, as the star connectors 21 and 24 cannot detect the failure and will not switch through the redundant path 28.

SUMMARY OF THE INVENTION

An object of the invention is to interconnect computers and/or computer networks with a network system insuring a simple and redundant operation, if a connecting line and/or a coupling circuit fails even in complex network systems.

This object may be attained by detecting interruptions in the network system and activating a redundant connection.

The process according to the invention initially determines whether interruption of a connecting line or the outage of a nodal point such as a star connector, interrupts the network system. Upon appearance of an interruption, a redundant connection, not active in undisturbed operation, is activated. In this manner a redundant part is switched through, so that the operating safety of the network system is assured even in the case of the failure of a line or a coupling point.

According to a further embodiment, the activated redundant connection is deactivated if there is no interruption or the interruption, which is to be compensated by the redundant path, is eliminated.

The redundant connection may be provided in any location in the network and may be between any of the computers, computer networks combined into a network system, and/or coupling circuits. It is advantageous to provide at least two redundant connections in a network.

According to one embodiment of the process according to the invention, a principal connection path of the connecting means is placed for activation or deactivation in the conducting or non-conducting state.

The redundant connecting means may determine whether a data signal appears simultaneously or within a predetermined period of time. The result of this determination is then used to decide whether the redundant path is switched through or not, preferably in a manner such that the redundant connecting means are activated if a data signal does not appear simultaneously or within a predetermined period of time at its two connectors. The redundant connecting means are deactivated if at its two connectors a data signal appears simultaneously at both connectors. This indicates that the data signal from a nodal point arrives through both network connections at the redundant connecting means. This signifies that there are no interruptions in the network system. In this case the redundant path of the redundant connecting means is interrupted and ring connections are avoided. If, on the other hand, a data signal appears at only one connector of the redundant connecting means within a given period of time, the data signal fed in at any nodal point is transported from there in one direction only, while an interruption must be present in the other direction. In this case the redundant path of the redundant connecting means is switched through and the network system continues to operate in a regular fashion.

It is advantageous in this case to choose the given period of time during which a data signal appears simultaneously at both connectors linked with the network, to be larger than the largest transit time mismatch of a data signal in the network system. This insures that a data signal or data packet fed in at any point of the network system has arrived within the given period of time at both connections of the redundant connecting means. There is, therefore, no interruption in the network and the redundant path of the redundant connecting means may be brought into or maintained in the non-conducting state. If a CSMA/CD (Carrier Sense Multiple Access/Collision Detection) process is used, the predetermined period of time is preferably greater than the time corresponding to one-half of the smallest permissible packet length. This criterion is especially advantageous, as the CSMA/CD access process is designed so that multiple access to the process by several parties must be detected simultaneously everywhere in the network, which is assured if the requirement of said access process is satisfied, i.e., that the longest transit time between two arbitrary parties cannot be larger than the period of time corresponding to one-half of the smallest permissible packet length. Therefore, if there is no interruption in the network system, in view of the aforementioned requirement of the access process, within a period of time corresponding to one-half of the smallest permissible packet length, a data signal must appear from both sides at the redundant connecting means.

According to an alternative or additional embodiment, the redundant connecting means may determine whether a data signal is longer than the period of time corresponding to the largest permissible data packet. If this is the case, it indicates that a data packet must be running within a closed ring connection. According to another embodiment of the invention, the redundant connective device may be deactivated in connection with said determination, i.e., the redundant path is interrupted if the data signal is longer than the time corresponding to the largest permissible data packet. This insures that a closed connection ring, which for example arise when following a previous interruption in the network system is eliminated, is canceled out.

Detection of a data signal shorter than the time corresponding to the largest permissible data packet by the redundant connecting device indicates that there is no interruption in the network system, so that the redundant system of the redundant connecting device may be or is to remain interrupted.

It is further highly advantageous if the redundant connective device determines whether a data signal is shorter than the time corresponding to the smallest permissible data packet. Fragments shorter than the smallest permissible data packet may appear in the network system due to collisions, a defective data station linked to the network, or other interferences. These data packet fragments may not appear simultaneously at the connections of the redundant connective device, so that the latter is unable to detect a closed ring. This fact may be taken into account by the detection of shorter data signals than those corresponding to the smallest permissible data packet. According to another related embodiment, the redundant connective device is deactivated and its redundant path switched off, if a predetermined number of data fragments appears. It is advantageous to make the given number of data fragments adjustable.

According to a highly advantageous embodiment of the invention, the redundant connective device may determine whether a data signal collision is present in the network system. Such a signal occurs if a data signal transmission and a data receiving process take place simultaneously. If a given number of data signal collisions are detected, the redundant connective device is deactivated, and the closed connection ring interrupted. It is impossible in this manner to insure that no closed ring appears in the network system.

According to another embodiment, the redundant connective device is activated and therefore the redundant connecting path switched through if no data signal collisions are detected within a given period of time. This is an indication that somewhere in the system an interruption is present.

In keeping with highly advantageous further development of the invention, the redundant connective device determines whether the duration of the data signal collisions is longer than a given period of time.

In the CSMA/CD access process during undisturbed operation, i.e., without the appearance of an interruption in the network system, the duration of a collision may not exceed the period of time corresponding to that of one half of the smallest permissible data packet, as the data stations involved in the collision will discontinue their transmission attempts following detection of a collision.

If, on the other hand, a closed connection ring exists in the network system, data packets may circulate in inverse directions, thereby generating collisions of a duration exceeding the maximum collision duration occurring in normal operation. According to this last embodiment, data signal durations due to collisions longer than a given period of time are detected. The period of time is preferably longer than one half the duration of the smallest permissible data packet. If the CSMA/CD process is used, the duration is longer than 25 microseconds. If a collision or data signal of such an excessive length occurs, it indicates the presence of a closed ring connection, and the redundant connective device may be deactivated and the redundant path is interrupted.

The object of the invention may be attained by a network system for interconnecting computers and/or computer networks. A redundant connective device may be provided for detecting interruptions. The device is activated upon detection of an interruption. According to the invention, certain line or nodal failures or other interferences may occur in any configuration network system without affecting the secure and reliable use of the network.

The redundant connective device may be switched into an inactive state if no interruption is detected. No closed ring connection leading to misfunctions in the network can appear if any kind of previous interruption is eliminated.

Advantageously, the redundant connective device is located between two nodal points of a network system and more than one redundant connecting device may be used.

According to an advantageous further development of the invention, the redundant connective device may be two interface cards connected by a redundant connecting link.

Advantageously, the redundant interface card may be placed into the segmented state upon activation of the redundant connective device and placed into the non-segmented state upon deactivation of the redundant connecting device.

Preferably, the redundant connective device comprises a watch-dog-timer, which determines the duration of a received and/or transmitted data signal. A watch-dog-timer of this type may be used for monitoring and determination of the data packet duration in keeping with the preceding embodiments.

The redundant connective device may be equipped with a fragment detection circuit, which recognizes data signals with a duration less than the smallest permissible data signal length.

It is preferable to equip the redundant connective device with a collision detection circuit which detects the multiple access of computers and/or computer networks to the network. The output signals of the collision detection circuit may again be used to activate and/or deactivate the redundant connecting device, i.e. to switch on or interrupt the redundant link.

The redundant connective device preferably includes a collision duration detection circuit, which determines the duration of collisions. Upon the appearance of an output signal of the collision duration detection circuit, the redundant connecting path of the redundant connective device is placed into the non-conducting state.

It is further advantageous to provide a release circuit, which eliminates the segmentation of the redundant connective device, if a data packet of a minimum duration of 51.2 micro seconds has been received or transmitted.

The invention will become more apparent from the following description with reference to the drawings.

DETAILED DESCRIPTION OF THE PREFERRED EMBODIMENT

Figure 1:
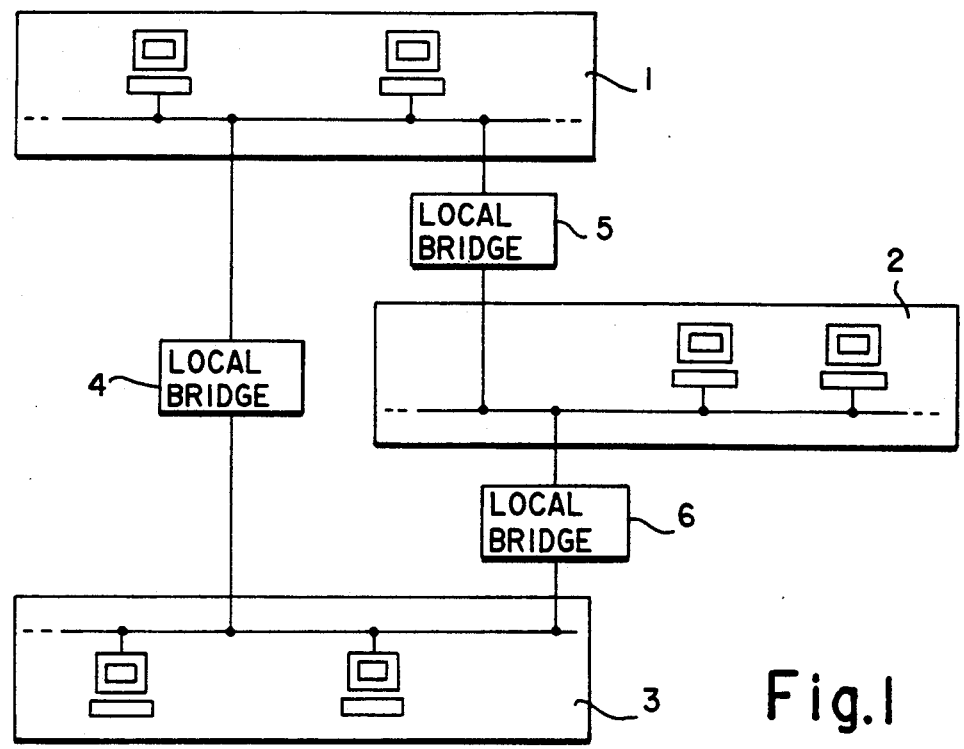
FIG. 1 shows a schematic view of a conventional network system of network segments using bridges.
Figure 2:
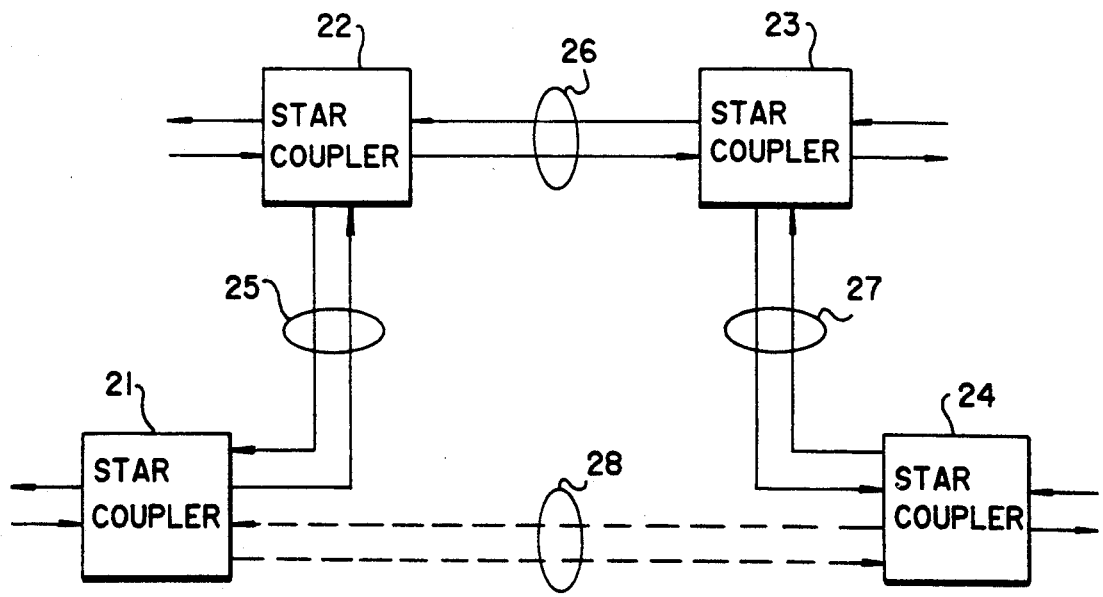
FIG. 2 shows a conventional network system with active star connectors and optical beamguides, using a redundant path.
Figure 3:
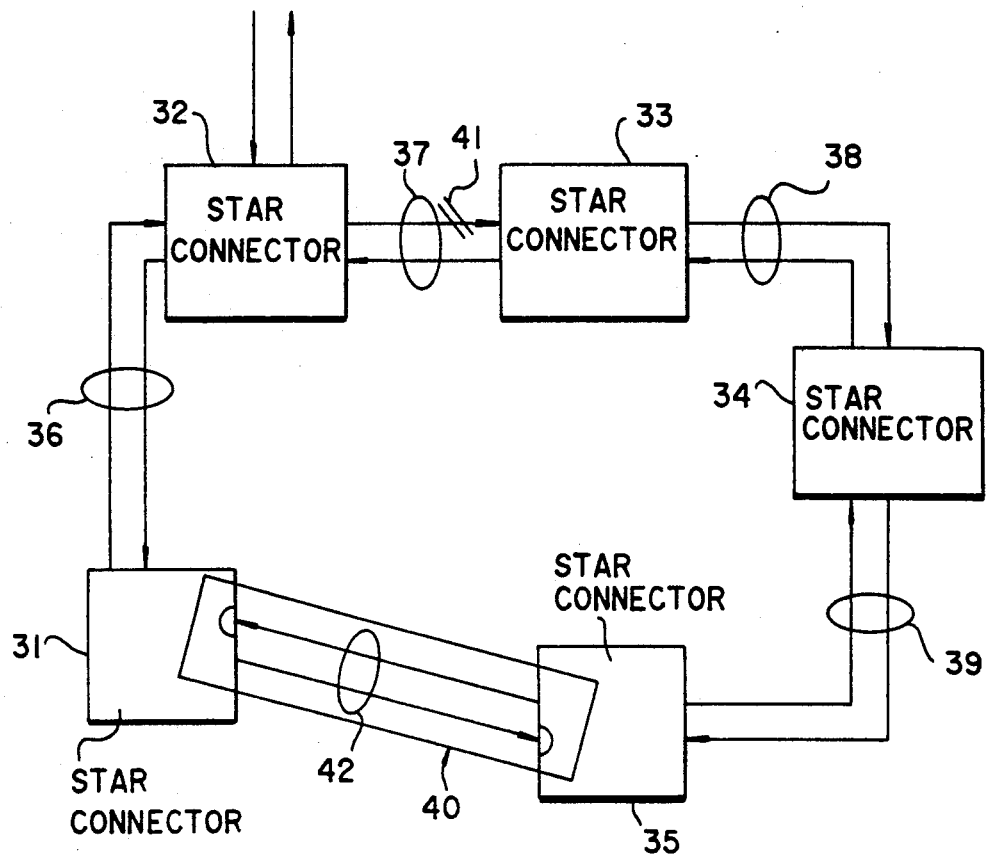
FIG. 3 shows an embodiment of the network system according to the invention in connection with an optical network.

FIG. 3 shows a network system according to the invention in connection with an optical network with active star connectors. The process according to the invention may be used with other networks and interconnections.

The star connectors 31, 32, 33, 34 and 35 are connected to each other in the manner shown by connecting lines 36, 37, 38, 39 in series. Each of the connecting lines 36, 37, 38 and 39 comprises at least two lines for the transmission of data signals, also referred to hereafter as data packets, in a direction and a counter direction. The individual star connectors are connected to participants or data stations, as indicated schematically for the star connectors 32 in FIG. 3. A redundant connective device 40 according to the invention is located between the star connector 31 and 35. The redundant connectinve device selectively connects the star connectors 31 and 35 as explained in more detail below.

If no redundant connective device 40 is present or in case of an inactive, i.e., non-conducting connection between the star connectors 31 and 35, data signals transmitted b a participant connected to the star connector 32 are passed over the connecting line 36 to the star connector 31, and through the connecting line 37 to the star connector 33, then over the connecting line 38 to the star connector 34, and finally over the connecting line 39 to the connector 35. All of the star connectors and thus all of the participants of the network system have access to the data in normal operation. If the connecting line 37 is interrupted (indicated in FIG. 3 by an oblique double line 41), the data packet transmitted by the participant connected to the star connector arrives over the connecting line 36 at the star connector 31 only. The network system is thus interrupted and access by any of the participants to any of the star connectors or data stations is no longer possible.

The function of the redundant connective device 40 is to detect an interruption in the network and activate and switch through a redundant path between the star connectors 31 and 35, so that even if there is an interruption 41 in the connecting line 37, all of the star connectors are still capable of exchanging data.

As mentioned above, the redundant connective device 40 detects an interruption in the network system when data packets do not appear simultaneously or within a given period of time at both of its connections to the network system. According to the illustrated embodiment, the redundant connective device is connected to star connectors 31 and 35. Due to the interruption 41 in the connecting line 37, data arrives at the star connector 31, but not at the star connector 35. The redundant connective device 40 is thereby activated, i.e. the redundant connecting path 42 is switched through. The network is therefore completely reconfigured and all participants may be reached.

A similar process takes places when, for example, data is fed over the star connector which, as a result of an interruption 41, arrives only at the star connector 35, but not at the star connector 31.

If the connecting line 37 becomes conducting following an interruption, data signals reach both sides of the redundant connecting device 40, which is then deactivated, i.e, the redundant connecting path 42 is interrupted and rendered inoperative. If data packets were allowed to run in a closed ring, access to the network system would be impossible according to the CSMA/CD process.

Figure 4:
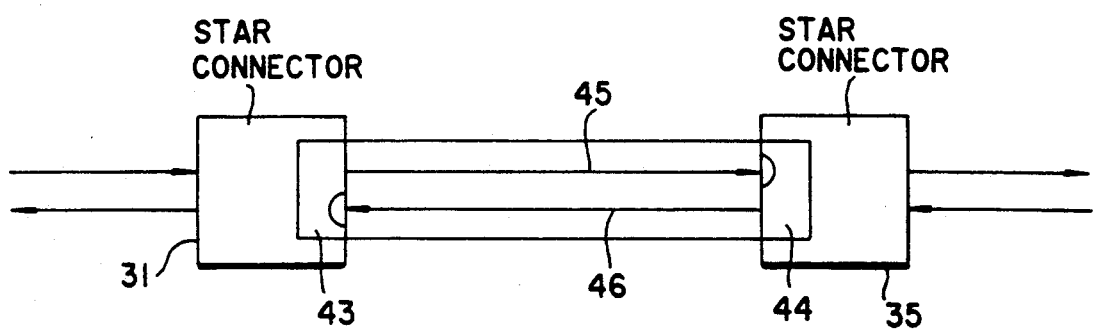
FIG. 4 shows a schematic view of a redundant connective device.

The redundant connective device 40 may be redundant interface cards 43, 44 forming parts of the star connector 31 and 35 and a redundant connecting path 45, 46, connecting them as shown in FIG. 4. The signals received over the redundant connecting path 45, 46 are tested at the redundant interface cards 43, 44 to determine whether the same data packet has arrived over the network line itself at the emitter of the redundant interface cards 43, 44. If the CSMA/CD access system is used, the overall running time of the data packet through the network system is always shorter than one-half of the packet length. If there is no interruption of the network system, redundant interface cards 43 and 44 always receive simultaneously. If an interruption 41 is present, the data packet only appears at the star connector 31 and is passed through the redundant connecting path 45, 46 to the redundant interface cards 44 located in the star connector 35. Due to an interruption 41, no data packet is sent simultaneously from the star connector 35 to the interface card 43 of the star connector 31. This information of the lack of the simultaneous appearance of the data packet at both connections of the redundant connecting device 40 is utilized to eliminate the segmentation of the receivers of the redundant interface cards 43, 44 and to switch through the redundant connecting path 45, 46 between the star connector 31 and the star connector 35.

If the previously interrupted line 37 of the network system is closed, a connecting ring closed in both directions is established. The redundant interface cards 43, 44 comprise circuit sections which determine whether the ring is closed. If this condition arises, the redundant interface cards 43, 44 pass into the segmented state, i.e., the data still sent over the redundant connecting path 45 and 46, but the receivers of the redundant interface cards do not pass the data on, as the card is in the segmented state. The initial state is thus restored.

Figure 5:
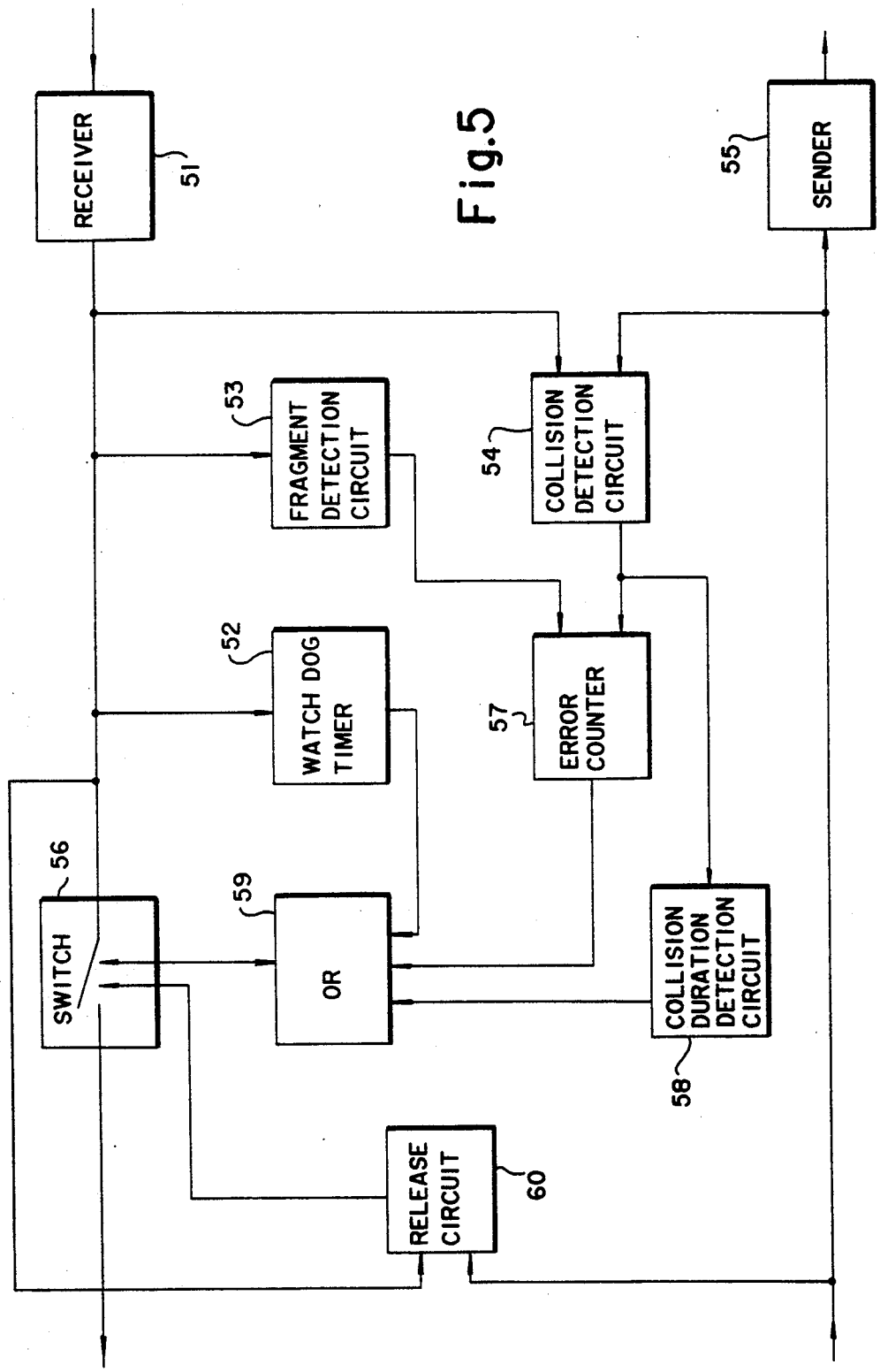
FIG. 5 shows a schematic block diagram representing a circuit layout example for the redundant connective device.

FIG. 5 shows a schematic circuit layout where the interface card is able to detect a closed ring connection in the network system.

A receiver 51 receives data and passes it to a watch dog timer 52, a fragment detection circuit 53 and a collision detection circuit 54. The collision detection circuit 54 also receives the emission data on the redundant interface card, which otherwise are transmitted over the sender 55 in the direction of the star collector from which the receive 51 receives its incoming data.

A switch 56 is located in the signal path of the receiving data. The switch outlet is connected to the distribution plane of the star connector. The output signals of the fragment detection circuit 53 and the collision detection circuit 54 arrive at an error counter 57. The output signal of the collision detection circuit 54 is also connected to a collision duration detection circuit 58. The watch dog timer 52, error counter circuit 57 and collision duration detection circuit 58 outputs are connected to the input of an OR gate 59. The output signal of the OR gate sets the switch 56 to a non-conducting state. An output signal of a release circuit 60 sets the switch 56 to the conducting state. The first input is connected to the output of the receiver 51 and the second input is connected to the input of the sender 55.

The watch dog timer 52 monitors the duration of the data signal or data packet received. If the length of the packet exceeds a predetermined threshold value, the watch dog timer 52 emits an output signal to the OR element 59, so that the switch 56 is switched into the non-conducting state. The threshold value for the watch dog timer 52 for the length of the packet received is chosen to be greater than the largest permissible packet length. An incoming packet length greater than the largest permissible packet length indicates a ring connection in the network system. The redundant interface card is placed into a segmented state and a closed connecting ring is interrupted upon such a determination by the watch dog timer 52.

The fragment detection circuit 53 detects packet fragments. Collisions, erroneously connected data stations or other interferences may create packet fragments when the duration of a fragment is shorter than the smallest permissible packet duration. In the case of the CSMA/CD access process this smallest permissible packet duration amounts to 51.2 microseconds (corresponding to 64 bytes). Depending on the duration of this data packet fragment and the running times in a closed connection ring, the data signal fragment may be offset in time when passing the emission and receiving channel of a redundant interface card, i.e., not overlapping. The redundant interface card is thus unable to detect a closed connecting ring by simple comparisons.

The fragment detection circuit 53 determines the duration of data packet received. If the duration determination of the packet received is less than that of the smallest permissible data packet, a counting pulse is generated for the error counter circuit 57. If the state of the error counting circuit 57 exceeds a predetermined selectable value, it emits an output signal, which reaches the switch 56 over the OR element 59 and places it into the non-conducting state, so that the redundant interface card is segmented.

The fragment detection circuit 53 thus makes it possible to interrupt a closed connecting ring with data packet fragments.

According to the CSMA/CD access process, data stations involved in collisions during an undisturbed operation of the network system discontinue their attempt to transmit as soon as a collision is detected. As it is a condition of the CSMA/CD access process that the maximum running time between two parties cannot be greater than one-half of the smallest permissible data packet, in order to be able to detect in the entire network system a multiple access, and as the smallest permissible packet length is 64 bytes, corresponding to 51.2 microseconds, the duration of the collision cannot exceed about 25 microseconds. If, however, a connecting ring is present in the network system, data packets may run in opposite directions, so that collision durations in excess of 25 microseconds are created. Therefore, if the duration of the collision exceeds such a limiting value, the collision duration detection circuit 58 emits a signal, which again places the switch 56 into the non-conducting state. The redundant interface card is segmented and the closed connection ring interrupted.

The collision detection circuit 54 is intended to detect the simultaneous transmission and reception of data. Every collision generates in the error counting circuit 57 a counting pulse. If the count of the error counting circuit 57 exceeds a given, variable value, said circuit also emits a signal, which places the switch 56 in the non conducting state. The redundant interface card 43 or 44 is again segmented and the closed connecting ring interrupted.

In the embodiment shown in FIG. 5, three criteria are provided, which alternatively lead to the segmentation of the redundant interface card 43 or 44. But it is also possible to specify further criteria for the interruption of a closed connection ring. The release circuit 60 eliminates this segmentation, if a data packet with a minimum duration of at least 51.2 microseconds has been received or transmitted with a collision.

We claim:

1. A process for interconnecting computers comprising the steps of:
   utilizing a redundant connective device to detect an interruption in a network system;
   activating said redundant connective device of the network system in response to an interruption detection;
   deactivating the activated redundant connective device when no interruption is detected;
   determining whether a data signal appears at two connectors of a redundant connective device connected to a network system within a first predetermined period of time;
   wherein the step of activation and deactivation of said connective device comprises at least the step of placing a principal connecting path into a conducting or the non-conducting state; and
   wherein a redundant connective device is provided at any location of the network system.

2. A process according to claim 1, further comprising the step providing at least two redundant connective devices in said network system.

3. A process according to claim 1, wherein said redundant connective device is activated if a data signal does not appear within a said first predetermined period of time at said two connectors.

4. A process according to claim 1, wherein said redundant connective device is deactivated if a data signal appears within a second predetermined period of time, at two connectors of said conductive device.

5. A process according to claim 4, wherein said second predetermined period of time is greater than the greatest running time mismatch of a data signal in the network system.

6. A process according to claim 4, wherein said second predetermined period of time in the case of the use of a CSMA/CD (Carrier Sense Multiple Access/Collision Detection) process is greater than a period of time corresponding to one half of the smallest permissible data packet.

7. A process according to claim 1, further comprising the step determining whether a data signal transmission time is longer than a period of time corresponding to the largest permissible data packet.

8. A process according to claim 7, wherein the redundant connective device is deactivated if a data signal transmission time is longer than the period of time corresponding to the largest permissible data packet.

9. A process according to claim 1, wherein said redundant connective device determines whether a data signal transmission time is shorter than the period of time corresponding to the smallest permissible data packet.

10. A process according to claim 9, further comprising the steps of:
counting occurrences of data signal transmission times which are shorter than the period of time corresponding to the smallest permissible data packet; and
deactivating said redundant connective device if a predetermined number of data signals shorter than the period of time corresponding to the smallest permissible data packet are detected.

11. A process according to claim 10, wherein said predetermined number of data signals is variable.

12. A process according to claim 1, further comprising the step of determining whether a data signal transmission and a data signal receiving process is simultaneous in the network system.

13. A process according to claim 12, further comprising the steps of:
counting the occurrences of simultaneous data signal transmissions and receptions in the network system; and
deactivating said redundant connective device if a predetermined number of simultaneous data signal transmission and receiving processes are counted.

14. A process according to claim 1, further comprising the step of determining whether the data signal duration of simultaneously occurring data signal transmissions and data signal receptions is greater than a predetermined period of time.

15. A process according to claim 14, wherein said redundant connective device is deactivated if said data signal duration of simultaneously occurring data signal transmissions and data signal receptions is greater than said predetermined period of time.

16. A process according to claim 15, wherein said predetermined period of time is smaller than or equal to one half of the duration of the smallest permissible data packet.

17. A process according to claim 16, wherein said predetermined period of time is less than 25.2 microseconds.

18. A network system for interconnecting computers comprising:
a redundant connective device responsive to a network system interruption detector wherein a connection path of said connective device is configured to switch into an active state in response to an interruption indication from said interruption detector, wherein said redundant connective device connects two nodal points of a network;
wherein said redundant connective device is configured to switch into an inactive state in response to a no-interruption indication from said interruption detector;
wherein said redundant connective device comprises at least two redundant interface cards and wherein said connection path is a redundant connecting path linking said interface cards;
wherein an interface card is placed into a segmented state upon deactivation of said redundant connective device and into a non-segmented state upon activation of said redundant connective device; and
a watch dog timer connected to said connective path.

19. A network system according to claim 18, wherein said interruption detector comprises means for determining an interruption in a network system connected to said redundant connective device.

20. A network system according to claim 18, wherein said redundant connective device comprises a fragment detection circuit means for detecting data signals with a duration smaller than a smallest permissible data signal length.

21. A network system according to claim 20, wherein said redundant connective device comprises a collision detection circuit means for detecting multiple access of computers and/or computer networks to the network system.

22. A network system according to 21, wherein said redundant connective device comprises a collision duration detection circuit means for detecting duration of a collision.

23. A network system according to claim 22, wherein said redundant connective device comprises a release circuit.

24. A network system for interconnecting computers comprising:
redundant connective means for detecting an interruption in a network system;
means for activating said redundant connective means of the network system in response to an interruption detection;
means for deactivating an activated redundant connective means when no interruption is detected;
wherein said means for activating and said means for deactivating said redundant connective means comprises at least means for switching a principal connecting path into a conducting or non-conducting state;
means for determining whether a data signal appears at two connectors of a redundant connective means connected to a network system within a first predetermined period of time; and
wherein said redundant connective means may be provided at any location of the network system.

* * * * *